(12) United States Patent
Qin et al.

(10) Patent No.: US 10,296,541 B2
(45) Date of Patent: May 21, 2019

(54) SEARCHING METHOD AND APPARATUS

(71) Applicant: Baidu Online Network Technology (Beijing) Co., Ltd., Beijing (CN)

(72) Inventors: Shouke Qin, Beijing (CN); You Han, Beijing (CN); Zeming Zhang, Beijing (CN); Zhiyang Chen, Beijing (CN); Xiaohua Cheng, Beijing (CN); Peizhi Xu, Beijing (CN); Xiaolin Ma, Beijing (CN); Yan Jiang, Beijing (CN); Shilei Wen, Beijing (CN); Shijia Chen, Beijing (CN); Xubin Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/302,833

(22) PCT Filed: Aug. 18, 2015

(86) PCT No.: PCT/CN2015/087322
§ 371 (c)(1),
(2) Date: Oct. 7, 2016

(87) PCT Pub. No.: WO2016/107190
PCT Pub. Date: Jul. 7, 2016

(65) Prior Publication Data
US 2017/0351711 A1 Dec. 7, 2017

(30) Foreign Application Priority Data
Dec. 30, 2014 (CN) .......................... 2014 1 0843805

(51) Int. Cl.
*G06F 17/30* (2006.01)
*G06F 16/58* (2019.01)
(Continued)

(52) U.S. Cl.
CPC ...... *G06F 16/5866* (2019.01); *G06F 16/3338* (2019.01); *G06F 16/51* (2019.01); *G06F 16/951* (2019.01)

(58) Field of Classification Search
CPC .............. G06F 17/30268; G06F 17/30; G06F 17/3028; G06F 17/30864; G06F 16/3338; G06F 16/951; G06F 16/51; G06F 16/5866
(Continued)

(56) References Cited

U.S. PATENT DOCUMENTS 7,099,860 B1 * 8/2006 Liu ................... G06F 17/30256
2009/0222406 A1 9/2009 Allred et al.
(Continued)

FOREIGN PATENT DOCUMENTS

CN 101984420 A 3/2011
CN 102609458 A 7/2012
(Continued)

OTHER PUBLICATIONS

Zhou, Xiang Sean, et al., "Unifying Keywords and Visual Content in Image Retrieval", IEEE Multimedia, vol. 9, Issue 2, Apr.-Jun. 2002, pp. 23-33.*
(Continued)

*Primary Examiner* — Robert Stevens
(74) *Attorney, Agent, or Firm* — Lathrop Gage LLP (57) ABSTRACT

Provided in the present disclosure are a computer-implemented searching method and a server. The computer-implemented searching method includes: receiving, at one or more computing devices, a current searching term sent by a client; obtaining, at the one or more computing devices, a picture-expressible term contained in the current searching term; obtaining, at the one or more computing devices, a picture result according to the picture-expressible term; and
(Continued)

sending, at the one or more computing devices, the picture result to the client. The present method improves the effect of the information expression of the search results.

15 Claims, 3 Drawing Sheets (51) Int. Cl.
*G06F 16/51* (2019.01)
*G06F 16/951* (2019.01)
*G06F 16/33* (2019.01)

(58) Field of Classification Search
USPC .......................................................... 707/741
See application file for complete search history.

(56) References Cited

U.S. PATENT DOCUMENTS

| 2010/0250539 A1* | 9/2010 | Zhou ................. G06F 17/30259 |
| | | 707/737 |
| 2012/0102044 A1* | 4/2012 | Ott, IV ............ G06F 17/30864 |
| | | 707/748 |
| 2012/0203772 A1 | 8/2012 | Cucerzan et al. |
| 2013/0138636 A1* | 5/2013 | Jin .................... G06F 17/30244 |
| | | 707/723 |

FOREIGN PATENT DOCUMENTS

| CN | 103136228 A | 6/2013 |
| CN | 101984420 B | 8/2013 |
| CN | 103678407 A | 3/2014 |
| CN | 103853797 A | 6/2014 |
| CN | 103942272 A | 7/2014 |
| CN | 103853797 A | 11/2014 |
| CN | 104504110 A | 4/2015 |
| CN | 104537072 A | 4/2015 |
| JP | H05120399 A | 5/1993 |
| JP | H10289242 A | 10/1998 |
| JP | H10301953 A | 11/1998 |
| JP | 2002140332 A | 5/2002 |
| JP | 2006285847 A | 10/2006 |
| JP | 2008171243 A | 7/2008 |
| JP | 2008177642 A | 7/2008 |
| JP | 2011048729 A | 3/2011 |
| KR | 20020004639 A | 1/2002 |

OTHER PUBLICATIONS

Japanese patent application No. 2017502227 English Translation of Notification of Reasons for Refusal dated Nov. 7, 2017, 3 pages.
PCT/CN2015/087322 English Translation of the International Search Report, dated Dec. 16, 2015; 3 pages.
PCT/CN2015/087322 English Translation of the Written Opinion of the International Searching Authority, dated Dec. 16, 2015, 6 pages.
Chinese Patent Application No. 201410843805.2, First Office Action dated Jun. 14, 2017, with English Translation, 14 pages.
Chinese Patent Application No. 201410843805.2 Office Action dated Jun. 14, 2017, 7 pages.
Chinese Patent Application No. 201410843805.2 English translation of Office Action dated Jun. 14, 2017, 7 pages.
Nie, L., et al.; Harvesting Visual Concepts for Image Search with Complex Queries; Proc of the 20th ACM Int'l Conference on Multimedia; Oct. 29, 2012, pp. 59-68.
European Patent Application No. 15874876.4 extended Search and Opinion dated Dec. 21, 2018, 11 pages.

* cited by examiner

SEARCHING METHOD AND APPARATUS

CROSS-REFERENCE TO RELATED APPLICATIONS

This application is a U.S. national phase of International Application No. PCT/CN2015/087322, filed on Aug. 18, 2015, which claims a priority to and benefits of Chinese Patent Application No. 201410843805.2 filed on Dec. 30, 2014 by BAIDU ONLINE NETWORK TECHNOLOGY (BEIJING) CO., LTD., and titled with "a searching method and a searching apparatus"

FIELD

The present disclosure relates to the field of Internet technology, and more particularly to a searching method and a searching apparatus.

BACKGROUND

At present, search engines provide searching results mainly via gathering data information where the related keywords lie in Internet. The result data is generally extracted from databases according to hit condition of a searching request, and is rendered on a webpage.

However, the searching results obtained by this method are generally text data, which makes poorer information expression effect.

SUMMARY

Embodiments of a first aspect of the present disclosure provide a searching method. The method includes: receiving a current searching term sent by a client; obtaining a picture-expressible term contained in the current searching term and obtaining a picture result according to the picture-expressible term; and sending the picture result to the client.

Embodiments of a second aspect of the present disclosure provide a searching method. The method includes: receiving a current searching term; obtaining a picture result according to the current searching term, in which the picture result is obtained according to a picture-expressible term after it is obtained that the current searching term includes the picture-expressible term; and displaying the picture result.

Embodiments of a third aspect of the present disclosure provide a searching apparatus. The apparatus includes: a receiving module configured to receive a current searching term sent by a client; an obtaining module configured to obtain a picture-expressible term contained in the searching term and to obtain a picture result according to the picture-expressible term; and a sending module configured to send the picture result to the client.

Embodiments of a fourth aspect of the present disclosure provide a searching apparatus. The apparatus includes: a receiving module configured to receive a current searching term; an obtaining module configured to obtain a picture result according to the current searching term, in which the picture result is obtained according to a picture-expressible term after it is obtained that the current searching term includes the picture-expressible term; and a displaying module configured to display the picture result.

Embodiments of the present disclosure further provide a server. The server includes one or more processors, a memory and one or more programs stored in the memory. When the one or more programs are executed by the one or more processors, perform the method according to embodiments of the first aspect of the present disclosure.

Embodiments of the present disclosure further provide a user terminal. The terminal includes one or more processors, a memory and one or more programs stored in the memory. When the one or more programs are executed by the one or more processors, perform the method according to embodiments of the second aspect of the present disclosure.

Embodiments of the present disclosure further provide a non-transitory computer storage medium, in which the computer storage medium includes one or more modules, and the one or more modules are caused to perform the method according to embodiments of the first aspect of the present disclosure.

Embodiments of the present disclosure further provide a non-transitory computer storage medium, in which the computer storage medium includes one or more modules, and the one or more modules are caused to perform the method according to embodiments of the second aspect of the present disclosure.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure. Instead, the embodiments of the present disclosure comprise all the variants, modifications and their equivalents within the spirit and scope of the present disclosure as defined by the claims.

Figure 1:
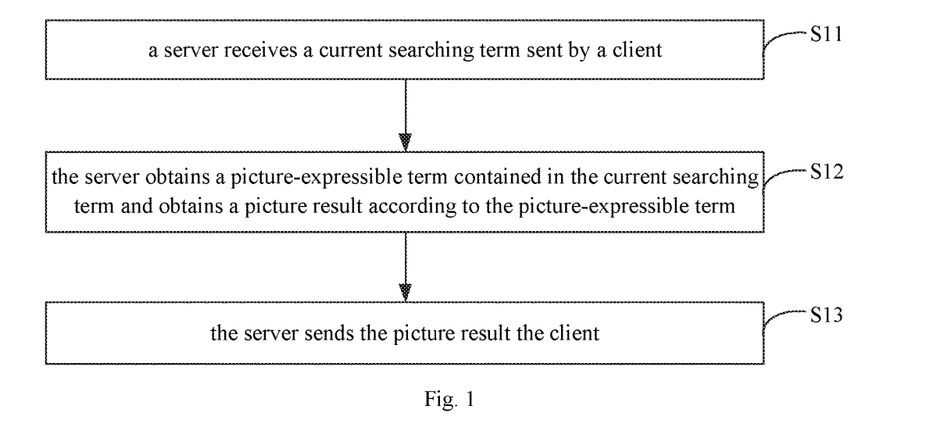
FIG. 1 is a flow chart showing a searching method according to an embodiment of the present disclosure.

FIG. 1 is a flow chart showing a searching method according to an embodiment of the present disclosure. The method includes the followings.

In block S11, a server receives a current searching term sent by a client.

For example, a user may input the searching term (query) into a search engine. The searching term is also called a query term or a retrieval term. The searching term may be a word, a phrase or a sentence.

After the client of the search engine receives the current searching term inputted by the user, it may send the current searching term to the server.

In block S12, the server obtains a picture-expressible term contained in the current searching term and obtains a picture result according to the picture-expressible term.

The picture-expressible term is the word corresponding to the searching result including pictures.

Alternatively, a picture-expressible term library is pre-built such that the picture-expressible term that belongs to the picture-expressible term library is obtained from the current searching term, if the current searching term is received.

Figure 2:
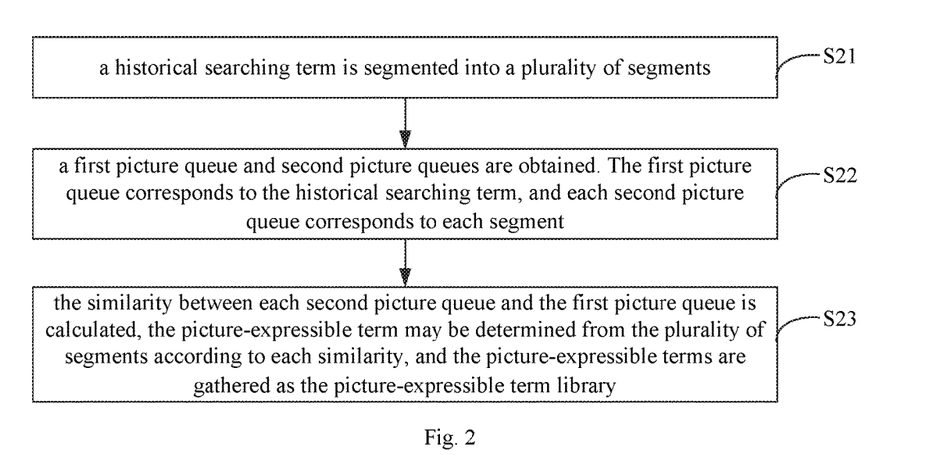
FIG. 2 is a flow chart showing establishing a picture-expressible term library according to an embodiment of the present disclosure.

As shown in FIG. 2, establishing the picture-expressible term library includes the followings.

In block S21, a historical searching term is segmented into a plurality of segments.

The searching term may be segmented by common word segmentation algorithms into a plurality of words which are taken as the plurality of segments.

For example, the historical searching term is "travel from Beijing to Lugu Lake", which is segmented into four segments: Beijing, to, Lugu Lake and travel.

In block S22, a first picture queue and second picture queues are obtained. The first picture queue corresponds to the historical searching term, and each second picture queue corresponds to each segment.

Specifically, a searching is performed according to each historical searching term and each fragment respectively, such that the first picture queue and the second picture queue may be obtained respectively.

For example, if a searching with the searching term "travel from Beijing to Lugu Lake" is performed, 30 pictures may be obtained. If a searching with the searching term "Beijing" is performed, other 30 pictures may be obtained. Similarly, picture queues, corresponding to the searching terms "to", "Lugu Lake" and "travel" respectively, may be obtained.

It could be understood that, the number of pictures in each above picture queue may be other predetermined number. In addition, there may be different numbers of pictures in different queues.

In block S23, the similarity between each second picture queue and the first picture queue is calculated, the picture-expressible term may be determined from the plurality of segments according to each similarity, and the picture-expressible terms are gathered as the picture-expressible term library.

For example, the similarity of the picture queue corresponding to "Beijing" and the picture queue corresponding to "travel from Beijing to Lugu Lake" is calculated to get a first value; the similarity of the picture queue corresponding to "to" and the picture queue corresponding to "travel from Beijing to Lugu Lake" is calculated to get a second value; the similarity of the picture queue corresponding to "Lugu Lake" and the picture queue corresponding to "travel from Beijing to Lugu Lake" is calculated to get a third value; the similarity of the picture queue corresponding to "travel" and the picture queue corresponding to "travel from Beijing to Lugu Lake" is calculated to get a fourth value.

If one picture-expressible term is selected for each historical searching term, the one with highest similarity may be selected. For example, if the third value is the biggest, the picture-expressible term corresponding to "travel from Beijing to Lugu Lake" is determined to be "Lugu Lake".

It could be understood that, there may be a plurality of picture-expressible terms corresponding to each searching term, and the words with higher similarity are taken as the picture-expressible terms.

Specifically, the similarity between two picture queues may be calculated by following ways.

The characteristics of each picture in each picture queue are extracted. For example, the visual characteristics are extracted. Specifically, the pixel color change value in the picture is extracted via predetermined math algorithms.

The picture queue is mapped into a vector with predetermined dimensions according to the extracted characteristics. For example, a calculation of taking an average value is performed on the extracted characteristic information of each picture in the picture queue, and the queue is mapped into a space with predetermined dimensions according to the average value such that the vector with predetermined dimensions may be obtained corresponding to each picture queue.

After mapping each picture queue into the vector with predetermined dimensions, the distances of the vectors may be calculated. For example, the cosine distance is calculated such that the calculated distance value is taken as the similarity value.

After establishing the picture-expressible term library, if the current searching term is received, the picture-expressible term contained in the current searching term may be determined. For example, the current searching term is "travel from Beijing to Lugu Lake"; as "Lugu Lake" belongs to the picture-expressible term library, it may be determined that the picture-expressible term contained in the current searching term is "Lugu Lake".

After determining the picture-expressible term contained in the current searching term, the searching result may be obtained according to the picture-expressible term.

Alternatively, the searching result may be obtained according to the picture-expressible term by acts of:

obtaining the searching result according to the current searching term and extracting a picture from the searching result; and determining the picture as the picture result sent to the client, if the picture includes characteristic information corresponding to the picture-expressible term.

Specifically, the searching result may be obtained via the common searching way according to the current searching term. The searching result may include text or picture, from which the picture may be extracted, and the comparison between the extracted picture and the picture-expressible term is performed. If the characteristic information of the picture-expressible term is contained in the extracted picture, the extracted picture is taken as the final picture to send to the client. For example, if the text information of Lugu Lake is contained in the obtained picture or the visual characteristics of Lugu Lake are contained in the obtained picture after extracting visual characteristics, the picture is taken as the final picture result to send to the client.

In block S13, the server sends the picture result the client.

After obtaining the picture result, taking the picture result as the searching result, the server may send the picture result to the client. The picture result received by the client may be displayed in the searching result webpage.

For example, if the current searching term is "travel from Beijing to Yunnan Lugu Lake", the picture that includes Lugu Lake information may be displayed in the client.

In could be understood that, besides obtaining the above picture result, the server may obtain the text result corresponding to the current searching term and may send the text result and the picture result as the searching result. Besides the picture result, the client may display the text result or other information.

With the embodiments, by obtaining the picture-expressible term contained in the current searching term, and by obtaining the picture result according to the picture-expressible term, as the picture may give a quick and vivid expression of information and may contain more information, the demands of pictures by the user are discovered according to the searching term, and then, the picture is provided as the searching result, thereby enhancing the information expression effect.

Figure 3:
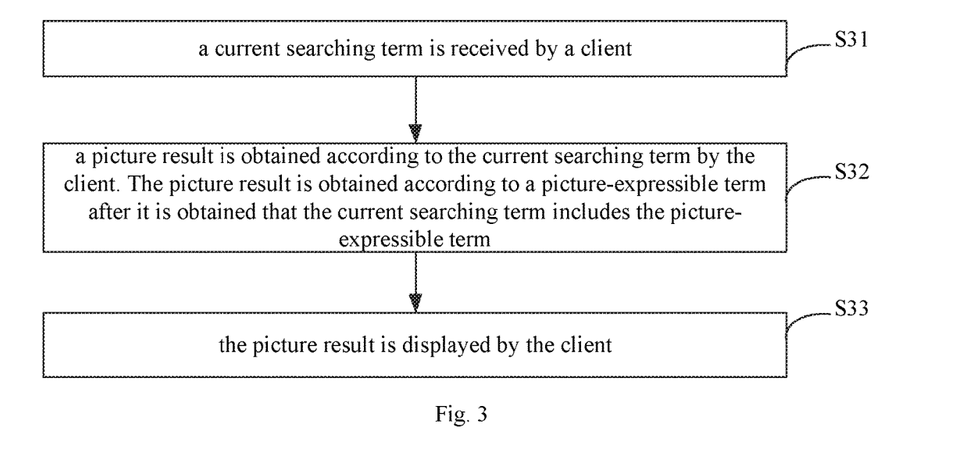
FIG. 3 is a flow chart showing a searching method according to another embodiment of the present disclosure.

FIG. 3 is a flow chart showing a searching method according to another embodiment of the present disclosure. The method includes the followings.

In block S31, a current searching term is received by a client.

For example, the current searching term inputted by a user is received by a search engine.

In block S32, a picture result is obtained according to the current searching term by the client. The picture result is obtained according to a picture-expressible term after it is obtained that the current searching term includes the picture-expressible term.

Alternatively, the picture result is obtained according to the current searching term by act of:

sending the current searching term to the server, such that the server may obtain the picture-expressible term contained in the current searching term and obtain the picture result according to the picture-expressible term; and receiving the picture result sent by the server.

The detail process of obtaining the picture result by the server may be illustrated in the above embodiment, there are no descriptions herein.

In block S33, the picture result is displayed by the client.

After receiving the picture result which is taken as the searching result sent by the server, the client may display the picture result in the searching result webpage.

For example, if the current searching term is "travel from Beijing to Yunnan Lugu Lake", the picture that includes the Lugu Lake information is displayed by the client.

It could be understood that, besides obtaining the above picture result, the server may obtain the text result corresponding to the current searching term and may send the text result and the picture result as the searching result. Besides the picture result, the client may show the text result or other information.

With the embodiments, by obtaining the picture result according to the current searching term, in which the picture result is obtained according to the picture-expressible term contained in the current searching term, as the picture may give a quick and vivid expression of information and may contain more information, the demands of pictures by the user are discovered according to the searching term, and then, the picture is provided as the searching result, thereby enhancing the information expression effect.

Figure 4:
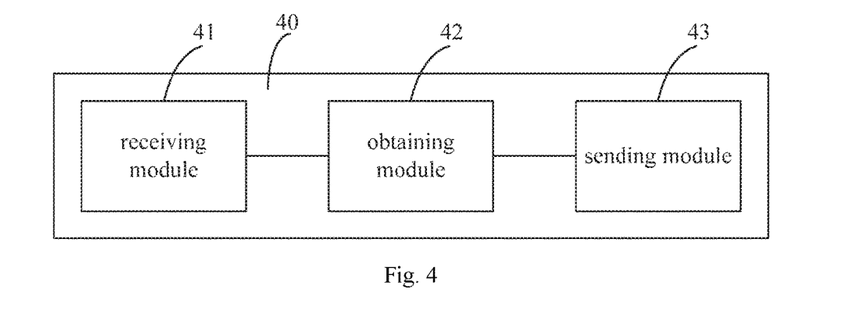
FIG. 4 is a schematic diagram illustrating a searching apparatus according to another embodiment of the present disclosure.

FIG. 4 is a schematic diagram illustrating a searching apparatus according to another embodiment of the present disclosure. The apparatus 40 may be located in the server, which includes a receiving module 41, an obtaining module 42 and a sending module 43.

The receiving module 41 is configured to receive a current searching term sent by a client.

For example, a user may input the searching term (query) into a search engine. The searching term is also called a query term or a retrieval term. The searching term may be a word, a phrase or a sentence.

After the client of the search engine receives the current searching term inputted by the user, it may send the current searching term to the server.

The obtaining module 42 is configured to obtain a picture-expressible term contained in the current searching term and to obtain a picture result according to the picture-expressible term.

The picture-expressible term is the word corresponding to the searching result including pictures.

Alternatively, a picture-expressible term library is pre-built such that the picture-expressible term that belongs to the picture-expressible term library is obtained from the current searching term, if the current searching term is received.

Figure 5:
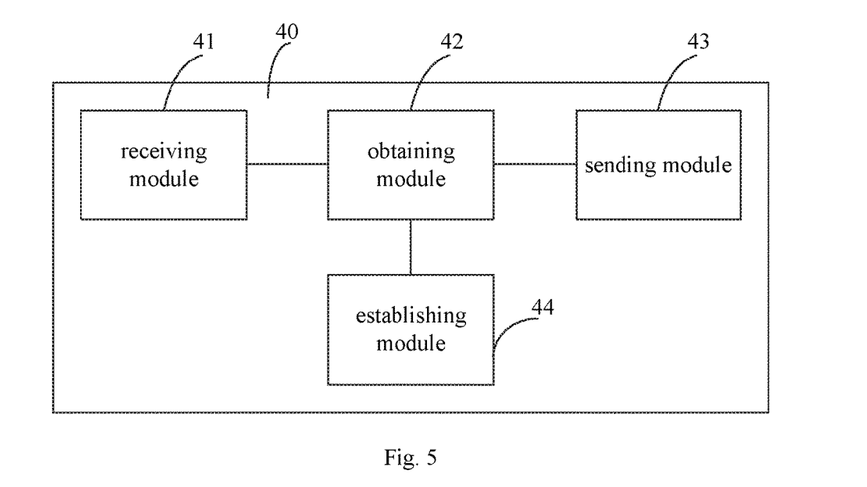
FIG. 5 is a schematic diagram illustrating a searching apparatus according to another embodiment of the present disclosure.

In another embodiment, shown as FIG. 5, the apparatus 40 further includes an establishing module 44.

The establishing module 44 is configured to establish the picture-expressible term library.

Correspondingly, the obtaining module 42 is specifically configured to:

obtain the picture-expressible term contained in the current searching term from the picture-expressible term library.

Alternatively, the establishing module 44 is specifically configured to segment a historical searching term into a plurality of segments.

The searching term may be segmented by common word segmentation algorithms into a plurality of words which are taken as the plurality of segments.

For example, the historical searching term is "travel from Beijing to Lugu Lake", which is segmented into four segments: Beijing, to, Lugu Lake and travel.

The establishing module 44 is specifically configured to obtain a first picture queue and second picture queues. The first picture queue corresponds to the historical searching term, and each second picture queue corresponds to each segment.

Specifically, a searching is performed according to each historical searching term and each fragment such that the first picture queue and the second picture queue may be obtained respectively.

For example, if a searching with the searching term "travel from Beijing to Lugu Lake" is performed, 30 pictures may be obtained. If a searching with the searching term "Beijing" is performed, other 30 pictures may be obtained. Similarly, picture queues, corresponding to the searching term "to", "Lugu Lake" and "travel" respectively, may be obtained.

It could be understood that, the number of pictures in each above picture queue may be other predetermined number. In addition, there may be different numbers of pictures in different queues.

The establishing module 44 is specifically configured to calculate the similarity between each second picture queue and the first picture queue such that the picture-expressible term may be determined from the plurality of segments according to each similarity and the picture-expressible terms are gathered as the picture-expressible term library.

For example, the similarity of the picture queue corresponding to "Beijing" and the picture queue corresponding to "travel from Beijing to Lugu Lake" is calculated to get a first value; the similarity of the picture queue corresponding to "to" and the picture queue corresponding to "travel from Beijing to Lugu Lake" is calculated to get a second value; the similarity of the picture queue corresponding to "Lugu Lake" and the picture queue corresponding to "travel from Beijing to Lugu Lake" is calculated to get a third value; the similarity of the picture queue corresponding to "travel" and the picture queue corresponding to "travel from Beijing to Lugu Lake" is calculated to get a fourth value If one picture-expressible term is selected for each historical searching term, the one with highest similarity may be selected. For example, if the third value is the biggest, the picture-expressible term corresponding to "travel from Beijing to Lugu Lake" is determined to be "Lugu Lake".

It could be understood that, there may be a plurality of picture-expressible terms corresponding to each searching term, and the words with higher similarity are taken as the picture-expressible terms.

Specifically, the similarity between two picture queues may be calculated by following ways.

The characteristics of each picture in each picture queue are extracted. For example, the visual characteristics are extracted. Specifically, the pixel color change value in the picture is extracted via predetermined math algorithms.

The picture queue is mapped into a vector with predetermined dimensions according to the extracted characteristics. For example, a calculation of taking an average value is performed on the extracted characteristic information of each picture in the picture queue, and the queue is mapped into a space with predetermined dimensions according to the average value such that the vector with predetermined dimensions may be obtained corresponding to each picture queue.

After mapping each picture queue into the vector with predetermined dimensions, the distances of the vectors may be calculated. For example, the cosine distance is calculated such that the calculated distance value is taken as the similarity value.

After establishing the picture-expressible term library, if the current searching term is received, the picture-expressible term contained in the current searching term may be determined. For example, the current searching term is "travel from Beijing to Lugu Lake", as "Lugu Lake" belongs to the picture-expressible term library, it may be determined that the picture-expressible term contained in the current searching term is "Lugu Lake".

After determining the picture-expressible term contained in the current searching term, the searching result may be obtained according to the picture-expressible term.

Alternatively, the obtaining module 42 is specifically configured to:

obtain the searching result according to the current searching term and extract a picture from the searching result; and determine the picture as the picture result sent to the client, if the picture includes characteristic information corresponding to the picture-expressible term.

Specifically, the searching result may be obtained via the common searching way according to the current searching term. The searching result may include text or picture, from which the picture may be extracted, and the comparison between the extracted picture and the picture-expressible term is performed. If the characteristic information of the picture-expressible term is contained in the extracted picture, the extracted picture is taken as the final picture to send to the client. For example, if the text information of Lugu Lake is contained in the obtained picture or the visual characteristics of Lugu Lake are contained in the obtained picture after extracting visual characteristics, the picture is taken as the final picture result to send to the client.

The sending module 43 is configured to send the picture result to the client.

After obtaining the picture result, taking the picture result as the searching result, the server may send the picture result to the client. The picture result received by the client may be displayed in the searching result webpage.

For example, if the current searching term is "travel from Beijing to Yunnan Lugu Lake", the picture that includes Lugu Lake information may be displayed in the client.

In could be understood that, besides obtaining the above picture result, the server may obtain the text result corresponding to the current searching term and may send the text result and the picture result as the searching result. Besides the picture result, the client may display the text result or other information.

With the embodiments, by obtaining the picture-expressible term contained in the current searching term, and by obtaining the picture result according to the picture-expressible term, as the picture may give a quick and vivid expression of information and may contain more information, the demands of pictures by the user are discovered according to the searching term, and then, the picture is provided as the searching result, thereby enhancing the information expression effect.

Figure 6:
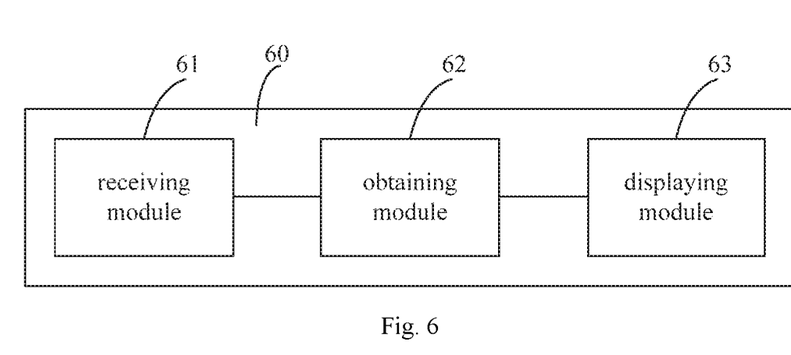
FIG. 6 is a schematic diagram illustrating a searching apparatus according to another embodiment of the present disclosure.

FIG. 6 is a schematic diagram illustrating a searching apparatus according to another embodiment of the present disclosure. The apparatus 60 may be located in the server, which includes a receiving module 61, an obtaining module 62 and a displaying module 63.

The receiving module 61 is configured to receive a current searching term.

For example, the current searching term inputted by a user is received by a search engine.

The obtaining module 62 is configured to obtain a picture result according to the current searching term. The picture result is obtained according to a picture-expressible term after it is obtained that the current searching term includes the picture-expressible term.

Alternatively, the obtaining module 62 is specifically configured to:

send the current searching term to the server such that the server may obtain the picture-expressible term contained in the current searching term and obtain the picture result according to the picture-expressible term; and receive the picture result sent by the server.

The detail process of obtaining the picture result by the server may be illustrated in the above embodiment, there are no descriptions herein.

The displaying module 63 is configured to display the picture result.

After receiving the picture result sent by the server, the client may display the picture result in the searching result webpage.

For example, if the current searching term is "travel from Beijing to Yunnan Lugu Lake", the picture that includes the Lugu Lake information is displayed by the client.

It could be understood that, besides obtaining the above picture result, the server may obtain the text result corresponding to the current searching term and may send the text result and the picture result as the searching result. Besides the picture result, the client may show the text result or other information.

With the embodiments, by obtaining the picture result according to the current searching term, in which the picture result is obtained according to the picture-expressible term contained in the current searching term, as the picture may give a quick and vivid expression of information and may contain more information, the demands of pictures by the user are discovered according to the searching term, and then, the picture is provided as the searching result, thereby enhancing the information expression effect.

Embodiments of the present disclosure further provide a server, which includes one or more processors, a memory and one or more programs stored in the memory. When the one or more programs are executed by the one or more processors, perform the method according to any one of embodiments of the first aspect of the present disclosure.

Embodiments of the present disclosure further provide a user terminal. The user terminal includes one or more processors, a memory and one or more programs stored in the memory. When the one or more programs are executed by the one or more processors, perform the method according to any one of embodiments of the second aspect of the present disclosure.

Embodiments of the present disclosure further provide a non-transitory computer storage medium having one or more modules stored therein. The one or more modules are caused to perform the method according to any one of embodiments of the first aspect of the present disclosure.

Embodiments of the present disclosure further provide a non-transitory computer storage medium having one or more modules stored therein. The one or more modules are caused to perform the method according to any one of embodiments of the second aspect of the present disclosure.

It should be noted that, in the description of the present disclosure, terms such as "first" and "second" are used herein for purposes of description and are not intended to indicate or imply relative importance or significance. Furthermore, in the description of the present disclosure, "a plurality of" refers to two or more unless otherwise specified.

Any process or method described in a flow chart or described herein in other ways may be understood to include one or more modules, segments or portions of codes of executable instructions for achieving specific logical functions or acts in the process, and the scope of a preferred embodiment of the present disclosure includes other implementations, in which the functions may be executed in other orders instead of the order illustrated or discussed, including in a basically simultaneous manner or in a reverse order, which should be understood by those skilled in the art.

It should be understood that each part of the present disclosure may be realized by the hardware, software, firmware or their combination. In the above embodiments, a plurality of acts or methods may be realized by the software or firmware stored in the memory and executed by the appropriate instruction execution system. For example, if it is realized by the hardware, likewise in another embodiment, the acts or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the acts in the above exemplifying method of the present disclosure may be achieved by commanding the related hardware with programs. The programs may be stored in a computer readable storage medium, and the programs include one or a combination of the acts in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A computer-implemented searching method, comprising:
   receiving, at one or more computing devices, a current searching term sent by a client;
   obtaining, at the one or more computing devices, a picture-expressible term contained in the current searching term;
   obtaining, at the one or more computing devices, a picture result according to the picture-expressible term; and
   sending, at the one or more computing devices, the picture result to the client;
   wherein before receiving the current searching term sent by the client, the method further comprises:
   establishing, at the one or more computing devices, a picture-expressible term library, wherein the picture-expressible term library comprises a plurality of pre-established picture-expressible terms;
   wherein obtaining the picture-expressible term contained in the current searching term comprises:
   segmenting, at one or more computing devices, the current searching terms into one or more searching term segments;
   searching for, at one or more computing devices, each of the one or more searching term segments in the picture-expressible term library;
   when the searching term segment is searched in the picture-expressible term library, determining, at one or more computing devices, the searching term segment as the picture-expressible term.

2. The method according to claim 1, wherein establishing, at the one or more computing devices, the picture-expressible term library, comprises:
- segmenting, at the one or more computing devices, a historical searching term into a plurality of segments;
- obtaining, at the one or more computing devices, a first picture queue and second picture queues, wherein the first picture queue corresponds to the historical searching term, and each second picture queue corresponds to each segment;
- calculating, at the one or more computing devices, a similarity between each second picture queue and the first picture queue;
- determining, at the one or more computing devices, the picture-expressible term from the plurality of segments according to each similarity; and
- gathering, at the one or more computing devices, the picture-expressible term as the picture-expressible term library.

3. The method according to claim 2, wherein calculating, at the one or more computing devices, the similarity between each second picture queue and the first picture queue, comprises:
- extracting, at one or more computing devices, characteristics of each picture in each second picture queue and characteristics of each picture in the first picture queue, wherein the number of pictures in each second picture queue is equal to the number of pictures in the first picture queue;
- mapping, at one or more computing devices, the first picture queue into a first vector with first predetermined dimensions according to the extracted characteristics of each picture in the first picture queue, wherein a size of the first predetermined dimensions is equal to the number of pictures in the first picture queue;
- mapping, at one or more computing devices, each second picture queue into a second vector with second predetermined dimensions according to the extracted characteristics of each picture in each second picture queue, wherein a size of the second predetermined dimensions is equal to the number of pictures in each second picture queue; and
- calculating, at one or more computing devices, a distance between each second vector and the first vector as the similarity between each second picture queue and the first picture queue.

4. The method according to claim 3, wherein determining, at the one or more computing devices, the picture-expressible term from the plurality of segments according to each similarity, comprises:
- obtaining, at the one or more computing devices, a plurality of similarities of the plurality of segments; and
- determining, at the one or more computing devices, a segment with the highest similarity in the plurality of segments as the picture-expressible term.

5. The method according to claim 1, wherein obtaining, at the one or more computing devices, a picture result according to the picture-expressible term, comprises:
- obtaining, at the one or more computing devices, a searching result according to the current searching term, wherein the searching result comprises texts and pictures;
- extracting, at the one or more computing devices, the picture from the searching result;
- performing, at the one or more computing devices, comparison between the extracted picture and the picture-expressible term; and
- determining, at the one or more computing devices, the extracted picture as the picture result sent to the client, if the extracted picture comprises text information corresponding to the picture-expressible term or if the extracted picture comprises visual characteristics of the picture-expressible term.

6. A server, comprising:
one or more processors;
a memory; and
one or more programs stored in the memory, when executed by the one or more processors, performing:
- receiving a current searching term sent by a client,
- obtaining a picture-expressible term contained in the current searching term,
- obtaining a picture result according to the picture-expressible term, and
- sending the picture result to the client;

wherein before receiving the current searching term sent by the client, the method further comprises:
- establishing a picture-expressible term library, wherein the picture-expressible term library comprises a plurality of pre-established picture-expressible terms;

wherein obtaining the picture-expressible term contained in the current searching term comprises:
- segmenting the current searching terms into one or more searching term segments;
- searching for each of the one or more searching term segments in the picture-expressible term library;
- when the searching term segment is searched in the picture-expressible term library, determining the searching term segment as the picture-expressible term.

7. The server according to claim 6, wherein establishing a picture-expressible term library, comprises:
- segmenting a historical searching term into a plurality of segments;
- obtaining a first picture queue and second picture queues, wherein the first picture queue corresponds to the historical searching term, and each second picture queue corresponds to each segment;
- calculating a similarity between each second picture queue and the first picture queue;
- determining the picture-expressible term from the plurality of segments according to each similarity; and
- gathering the picture-expressible terms as the picture-expressible term library.

8. The server according to claim 7, wherein calculating the similarity between each second picture queue and the first picture queue comprises:
- extracting characteristics of each picture in each second picture queue and characteristics of each picture in the first picture queue, wherein the number of pictures in each second picture queue is equal to the number of pictures in the first picture queue;
- mapping the first picture queue into a first vector with first predetermined dimensions according to the extracted characteristics of each picture in the first picture queue, wherein a size of the first predetermined dimensions is equal to the number of pictures in the first picture queue;
- mapping each second picture queue into a second vector with second predetermined dimensions according to the extracted characteristics of each picture in each second picture queue, wherein a size of the second predetermined dimensions is equal to the number of pictures in each second picture queue; and calculating a distance between each second vector and the first vector as the similarity between each second picture queue and the first picture queue.

9. The server according to claim 8, wherein determining the picture-expressible term from the plurality of segments according to each similarity, comprises:
obtaining a plurality of similarities of the plurality of segments; and
determining a segment with the highest similarity in the plurality of segments as the picture-expressible term.

10. The server according to claim 6, wherein the one or more programs perform obtaining a picture result according to the picture-expressible term by an act of:
obtaining a searching result according to the current searching term, wherein the searching result comprises texts and pictures;
extracting the picture from the searching result;
performing comparison between the extracted picture and the picture-expressible term; and
determining the extracted picture as the picture result sent to the client, if the extracted picture comprises text information of the picture-expressible term or if the extracted picture comprises visual characteristics of the picture-expressible term.

11. A non-transitory computer storage medium having one or more modules stored therein, wherein the one or more modules are caused to perform:
receiving a current searching term sent by a client;
obtaining a picture-expressible term contained in the current searching term;
obtaining a picture result according to the picture-expressible term; and
sending the picture result to the client;
wherein before receiving the current searching term sent by the client, the method further comprises:
establishing a picture-expressible term library, wherein the picture-expressible term library comprises a plurality of pre-established picture-expressible terms;
wherein obtaining the picture-expressible term contained in the current searching term comprises:
segmenting the current searching terms into one or more searching term segments;
searching for each of the one or more searching term segments in the picture-expressible term library;
when the searching term segment is searched in the picture-expressible term library, determining the searching term segment as the picture-expressible term.

12. The non-transitory computer storage medium according to claim 11, wherein establishing a picture-expressible term library, comprises:
segmenting a historical searching term into a plurality of segments;
obtaining a first picture queue and second picture queues, wherein the first picture queue corresponds to the historical searching term, and each second picture queue corresponds to each segment;
calculating a similarity between each second picture queue and the first picture queue;
determining the picture-expressible term from the plurality of segments according to each similarity; and
gathering the picture-expressible terms as the picture-expressible term library.

13. The non-transitory computer storage medium according to claim 12, wherein calculating the similarity between each second picture queue and the first picture queue comprises:
extracting characteristics of each picture in each second picture queue and characteristics of each picture in the first picture queue, wherein the number of pictures in each second picture queue is equal to the number of pictures in the first picture queue;
mapping the first picture queue into a first vector with first predetermined dimensions according to the extracted characteristics of each picture in the first picture queue, wherein a size of the first predetermined dimensions is equal to the number of pictures in the first picture queue;
mapping each second picture queue into a second vector with second predetermined dimensions according to the extracted characteristics of each picture in each second picture queue, wherein a size of the second predetermined dimensions is equal to the number of pictures in each second picture queue; and
calculating a distance between each second vector and the first vector as the similarity between each second picture queue and the first picture queue.

14. The non-transitory computer storage medium according to claim 13, wherein determining the picture-expressible term from the plurality of segments according to each similarity, comprises:
obtaining a plurality of similarities of the plurality of segments; and
determining a segment with the highest similarity in the plurality of segments as the picture-expressible term.

15. The non-transitory computer storage medium according to claim 11, wherein obtaining a picture result according to the picture-expressible term, comprises:
obtaining a searching result according to the current searching term, wherein the searching result comprises texts and pictures;
extracting the picture from the searching result;
performing comparison between the extracted picture and the picture-expressible term; and
determining the extracted picture as the picture result sent to the client, if the extracted picture comprises text information of the picture-expressible term or if the extracted picture comprises visual characteristics of the picture-expressible term.

* * * * *